United States Patent [19]

Pichot et al.

[11] Patent Number: 4,696,427
[45] Date of Patent: Sep. 29, 1987

[54] METHOD OF TRANSFORMING A PRE-EXISTING HEAT INSTALLATION, AND CONTROL DEVICE FOR IMPLEMENTING THE METHOD

[75] Inventors: Jacky Pichot, La Grande Paroisse; Jacques Oddou, Fontainebleau, both of France

[73] Assignee: Electricite de France, France

[21] Appl. No.: 843,702

[22] Filed: Mar. 25, 1986

[30] Foreign Application Priority Data

Mar. 28, 1985 [FR] France ................. 85 04665

[51] Int. Cl.$^4$ ............................................. G05D 23/00
[52] U.S. Cl. ................... 236/1 E; 236/46 C; 237/2 B; 237/12
[58] Field of Search ............ 237/2 B, 8 R, 12; 236/91 F, 1 E, 46 R, 46 A, 46 C; 62/324.1

[56] References Cited

U.S. PATENT DOCUMENTS 4,190,199  2/1980  Cawley et al. ................ 237/2 B

FOREIGN PATENT DOCUMENTS 2501837  9/1982  France ................. 237/2 B
2521696  8/1983  France ................. 237/2 B

OTHER PUBLICATIONS

Chaud-Froid Plomerie, vol. 440, Sep. 1983, pp. 69-76.
Revue Generale de Zhemique, vol. 21, Oct. 1982, pp. 795-809.

Primary Examiner—Henry A. Bennett

[57] ABSTRACT

The present invention relates to transforming a pre-existing heating installation comprising a main heat generator such as a boiler which is associated with a modulating mixer valve controlled by a P or PD type regulator which is responsive to outside temperature and to the departure temperature of the heating water. In accordance with the invention a control device is inserted between said pre-existing regulator and said pre-existing valve, said control device including an integrator module (110) connected to the output from said pre-existing regulator and controlling a threshold relay (120) which in turn provides successive on/off control of auxiliary heat generators such as heat pumps, when respective thresholds are detected, said control device further including a switch (170, 171, 161) controlled by the threshold relay in the event that heat demand exceeds the supply available from the auxiliary generators in order to allow the signals from the conventional regulator (6, 7) to be applied to the mixing valve in order to enable the main heat generator to be switched on.

17 Claims, 4 Drawing Figures

FIG_1 PRE-EXISTING REGULATION

FIG_4

METHOD OF TRANSFORMING A PRE-EXISTING HEAT INSTALLATION, AND CONTROL DEVICE FOR IMPLEMENTING THE METHOD

The present invention relates to heating.

The present invention relates more precisely to a method of transforming a pre-existing heating installation of the type shown in accompanying FIG. 1 (and described in greater detail below), together with a control device for implementing the method.

BACKGROUND OF THE INVENTION

Figure 1:
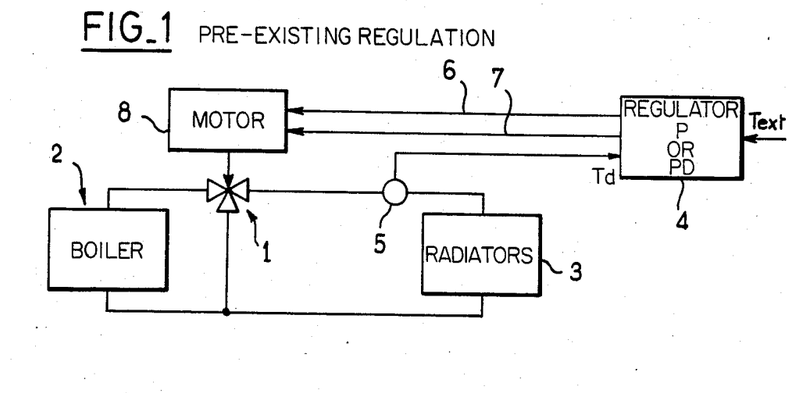
FIG. 1 is a diagram of a pre-existing regulation system which is described above.

Generally speaking, a hot water heating installation as shown in accompanying FIG. 1 includes a three-way modulating mixer valve 1 for regulating the departure temperature of water entering a set of radiators 3 from a boiler 2 as a function of the outside temperature.

The valve 1 is controlled by a proportional (P) or a proportional-plus-derivative (PD) type regulator 4 which compares the outside temperature Text with the water departure temperature Td, which it measures at a point 5 located between the valve 1 and the set of radiators, and which generates, in response thereto, two on/off signals on lines 6 and 7 for actuating a motor 8 associated with the valve 1 as a function of said temperatures.

Preferred implementations ofthe present invention serve to improve such a pre-existing installation by adding a plurality of auxiliary heat generators, such as heat pumps, for offloading the main heat generator, while keeping the cost of such a transformation within limits, and in particular while retaining the existing regulator and valve.

More particularly, regulation as provided in accordance with the present invention seeks:

to give priority to operating the auxiliary generators (heat pumps) over the conventional boiler, and to authorize combined operation of the auxiliary generators and the boiler, where it is appropriate for the boiler to make good shortfalls of heat supply when demand exceeds the capabilities of the heat pumps;

to switch the heat pumps on and off with sufficiently long on periods and off periods to ensure optimum operation thereof; and to control the mixing valve progressively and to switch on the boiler, which is itself controlled by its own thermostat.

SUMMARY OF THE INVENTION

Since conventional pre-existing P or PD type regulators 4 are unsuitable for controlling a plurality of auxiliary generators in cascade, the present invention provides a method of transforming a pre-existing heating installation comprising a main heat generator such as a boiler associated with a modulating mixer valve controlled by a P or PD type regulator responsive to the outside temperature and to the water departure temperature, by adding a plurality of auxiliary heat generators such as heat pumps to said installation to offload said main heat generator while retaining said pre-existing regulator and valve, said method comprising the step of inserting between said pre-existing regulator and said pre-existing valve a control device which comprises:

an integrating module connected to the outlet from the pre-existing regulator and controlling:

threshold relays controlling the bringing into service in succession of the auxiliary generators such as heat pumps, when their respective thresholds are reached, and a switch controlled by said threshold relays in the event of heat demand becoming excessive, thereby authorizing the application of signals from said pre-existing regulator to said mixing valve to enable said main heat generator to be brought into service.

Numerous types of heating installation which associate boilers with auxiliary generators of the heat pump type have already been proposed, as have methods of transforming pre-existing heating installations.

However, none of the methods or devices proposed heretofore teaches or suggests the present invention, and none has characteristics directly comparable to the present invention.

For example, the French application published under the No. 2 501 837 describes a heating installation comprising a boiler and a heat pump controlled by a regulator which comprises: a first probe measuring the return temperature of the heating fluid; a second probe measuring the outside temperature; a converter connected to said second probe; a limiter connected downstream from said converter; a comparator having a first input connected to receive the output from said first probe and having a second input connected to receive the output from said limiter; an integrator connected downstream from said comparator; and a plurality of threshold switches controlled by said integrator, principal threshold switches serving to switch on respective compression stages of said heat pump, while an auxiliary threshold switch serves to switch on said boiler.

However, this document does not suggest that the modulating mixer valve should be controlled via a device associated with the integrator device.

Furthermore, this document does not suggest that the regulator should be controlled by a probe which responds to the departure temperature of the heating fluid.

For these reasons, the characteristics of the installation described in French patent application No. 2 501 837 are not optimum.

Finally, said French patent application No. 2 501 837 does not teach or hint at reusing the preexisting regulator in any way.

French patent application published under the No. 2 521 696 also relates to a regulator for a heating installation including a boiler and a heat pump for offloading the boiler.

This regulator comprises: a probe measuring the departure temperature of the heating water; an outside probe; a microprocessor-controlled main programmer connected to both probes; and two distinct auxiliary programmers respectively controlling on/off regulation of the heat pump on its own or in association with the boiler (via contactor switches), and regulation relating solely to the boiler and operating by varying the outlet water flowrate by means of a mixing valve.

No doubt the use of a microprocessor-controlled programmer makes for very flexible regulation.

However, this prior document does not teach connecting an integrator module to the output of a pre-existing P or PD type regulator, nor does it teach controlling a mixer valve having a reversible motor; nor does it teach associating a threshold relay with an integrating module in order to provide stepwise control of the heat pumps.

Here again, and for the reasons give, the characteristics of such an installation are far from optimum.

Several types of regulation are described in the document "CHAUD-FROID PLOMBERIE, volume 440, September 1983, pages 69-76, 'Régulation d'une installation de chauffage PERCHE C et T' (Regulating a PERCHE C or T type heating installation)".

The regulation illustrated in FIG. 9 of this prior document proposes inserting a control box between pre-existing regulation and a heating installation per se including a mixing valve, a boiler and heat pumps.

The control box inserted between the pre-existing regulator and the heating installation uses adjustable timers to interpret the instructions received from the pre-existing regulator in order to control the heat pumps and the boiler.

This document does not suggest replacing the above-mentioned adjustable timers by an integrator associated with threshold relays.

Tests performed on the equipment described in said prior document have shown that it suffers from several weaknesses.

Finally, various kinds of regulation are described in the document "Revue générale de thermique, volume 21, October 82, pages 795-809, 'La pompe à chaleur en relève de chaudière existante dans les locaux tertiaires, Perche T' by Carasse (Perche T heat pumps offloading existing boilers in service industry premises)".

However, this prior document neither teaches nor suggests adapting pre-existing regulation by inserting a control device between a pre-existing valve and a pre-existing regulator which is sensitive to the water departure temperature and which is conserved, said control device including, inter alia an integrator module and threshold relays.

The present invention also provides a control device for implementing the above-defined method, said control device comprising:

an integrating module connected to the outlet from the pre-existing regulator and controlling:

threshold relays controlling the bringing into service in succession of the auxiliary generators such as heat pumps, when their respective thresholds are reached and, a switch controlled by said threshold relays in the event of heat demand becoming excessive, thereby authorizing the application of signals from said pre-existing regulator to said mixing valve to enable said main heat generator to be brought into service.

Preferably, the integrator module comprises at least one digital up/down counter.

More precisely, and advantageously, the count up and count down inputs to the integrator module are enabled by respective relays controlled by the outputs from the pre-existing regulator.

Advantageously, the control device further includes two two-input logic gates whose outputs are respectively connected to the count-up and count-down inputs of the integrator module, with one of the inputs to each logic gate being connected to a respective relay and with the other input of each logic gate being connected to the output from a clock which delivers an oscillatory signal at an adjustable frequency.

Preferably, the threshold relay comprises a digital memory having address lines connected to the outputs from the integrator module.

In order to avoid untimely problems related to electricity power cuts, the control device preferably includes a memory member whose inputs are connected to the outputs of the up/down digital counter and whose outputs are connected to the pre-select inputs thereof in order to reload the integrator module after a power cut to the state it occupied before the power cut.

In an advantageous implementation of the invention, the control device further includes a memory member whose input is connected to the output from the digital memory controlling the putting into service of a first boiler and whose output is connected to an address line of the digital memory in order to control said first boiler with hysteresis in such a way that when switched on the valve opens prior to the boiler being brought into service in order to heat the body of the boiler, but when switched off, the valve is closed before the boiler is stopped.

It is preferable for the control device in accordance with the present invention to further include means suitable for detecting when the up and down count inputs of the integrator module are enabled and having an output connected to an address line of the digital memory in order to determine commands having hysteresis for the auxiliary generators.

Here again, in order to avoid problems associated with possible electricity power cuts, the output from the means for detecting when the up and down count inputs of the integrator module are enabled is advantageously connected to the associated address line of the digital memory via a memory member.

Furthermore, in accordance with the invention, the above-mentioned memory members may advantageously be constituted by bistables powered from an uninterruptible electricity power supply.

BRIEF DESCRIPTION OF THE DRAWINGS

An implementation of the invention is described by way of example with reference to the accompanying drawings, in which.

MORE DETAILED DESCRIPTION

The overall structure of an installation implementing the invention is initially described with reference to accompanying FIG. 2.

This figure shows a set of conventional heat generators comprising a plurality of generators connected in parallel, e.g., oil-fired boilers CH1, CH2.

Hot water from the boilers CH1, CH2 is directed by means of a pipe 13 to a conventional three-path mixer valve 1.

One of the paths 14 from said conventional mixer valve 1 is looped back to the inlet to the boilers CH1, CH2.

Figure 2:
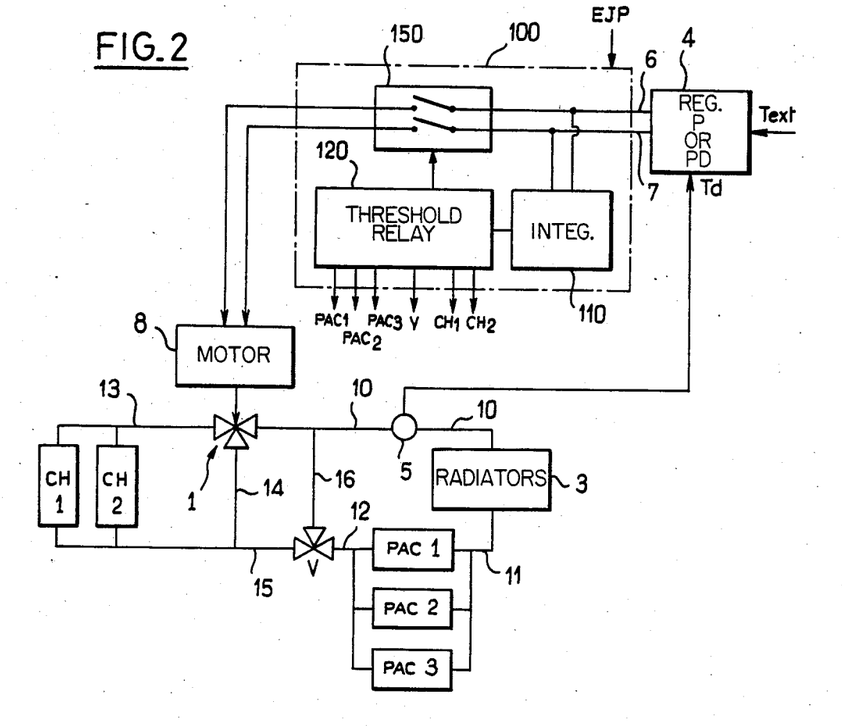
FIG. 2 is a diagram of a heating installation obtained by performing the transformation method in accordance with the present invention.

The other outlet path 10 from the mixer valve 1 is connected to the inlet of a set of radiators 3 which is constituted by a plurality of individual radiators connected in parallel, although it is represented as a single box in FIG. 2.

A probe 5 measures the departure temperature $T_d$ of the fluid supplied to the set of radiators, and said probe 5 is disposed in the outlet path or pipe 10 from the mixer valve, i.e. the common inlet to all of the radiators 3.

The fluid leaving the set of radiators 3 flows along a pipe 11 and passes through a set of auxiliary heat generators, such as heat pumps PAC1, PAC2, PAC3, which have been added to the heating installation in accordance with the invention. Although the present invention is described with specific reference to heat pumps, it must be understood that other types of functionally equivalent heat generator connected in parallel may be used instead.

The auxiliary heat generators PAC1, PAC2, PAC3 have a common outlet 12 which is connected to a bypass valve V. The bypass valve V is likewise a threepath valve.

One of the paths 15 from this bypass valve is connected to the inlet to the conventional heat generators CH1, CH2.

The other outlet path 16 from said bypass valve V is looped back to the inlet pipe 10 to the set of radiators.

FIG. 2 also shows the motor 8 for controlling the mixer valve 1, the pre-existing P or PD type regulator 4 which is responsive both to outside temperature Text and to the water departure temperature $T_d$, and which delivers switch on or switch off instructions to the conventional mixer valve in the form of pulse trains on respective outputs 6 and 7. FIG. 2 also shows a control device 100 in accordance with the present invention and inserted between the pre-existing regulator 4 and the mixer valve 1.

As mentioned above, the control device 100 comprises an integrator module 100 connected to the output from the pre-existing regulator and controlling threshold relays 120 which in turn are used to successively switch on the auxiliary generators such as the heat pumps PAC1, PAC2, PAC3 when corresponding thresholds are reached, and finally a switch 150 controlled by the threshold relays 120 in the event of excessive heat demand, in order to enable the signals from the conventional regulator 4 (lines 6 and 7) to be applied to the mixer valve 1 (i.e. to its control motor 8) so that the conventional heat generators can be brought into operation.

The outputs from the threshold relay 120 are labelled diagrammatically in FIG. 2 as PAC1, PAC2, PAC3, V, CH1 and CH2. These outputs are used respectively for switching on the auxiliary generators PAC1, PAC2 and PAC3, for opening the bypass valve V, and for bringing the conventional heat generators CH1 and CH2 into operation.

In conventional manner, the control device 100 has an input reference E, J, P for receiving a signal representative of different electricity charging periods to enable the outputs PAC1, PAC2, and PAC3 from the threshold relay to be disabled at certain times of day, where appropriate.

The structure of the control device 100 is now described with reference to FIG. 4.

This figure shows two input interfaces 101, 102 constituted by relays which are respectively controlled by the outputs 6 and 7 from the conventional regulator 4 in order to switch outputs 103 and 104 of said interfaces between two logic levels of +Vcc and 0 volts.

The outputs 103 and 104 from the input interfaces 101 and 102 are connected to respective first inputs of two logic gates 105 and 106 whose outputs 107 and 108 are respectively connected to a count-down input and a count-up input of a digital integrator 110.

The digital integrator 110 operates at an 8-bit counter.

In practice, the integrator 110 may be constituted as a cascade of five 4-bit binary up/down counters of the type CD 40193.

The first three counters divide the frequency of a clock signal applied to the second inputs of said gates 105 and 106 by $16^3$ in order to give the required digital resolution. The last two counters perform digital conversion of the integrated signal from the regulator.

The above-mentioned clock signal applied to the second inputs of gates 105 and 106 is generated by a clock 103.

The frequency of the clock signal delivered on output 131 of clock 130 is preferably switchable between two different values in order to define two different integration constants for the control device 100, with one of these time constants being used when regulating the heat pumps, and the other when regulating via the mixer valve.

The two clock signal frequencies are determined by respective resistances R1 and R2 (which are preferably adjustable) connected to an oscillator 132.

Switching between the resistances R1 and R2 in the frequency determining circuit of the oscillator 132 is provided by an output referenced 0V (open valve) from the threshold relay 120. In practice, switching between the resistances R1 and R2 is provided by a relay under the control of a transistor which receives the signal 0X on its base.

The oscillator is connected to a counter 132 (e.g., a 40193 type) which is set up as a down-counter. On arriving at zero, the down-counter 133 triggers a monostable 134 which, after a predetermined length of time, loads the down-counter 133 with logical values defined on pre-select inputs 135 thereof.

The output 131 from the clock is constituted by the output 136 from the counter.

Figure 4:
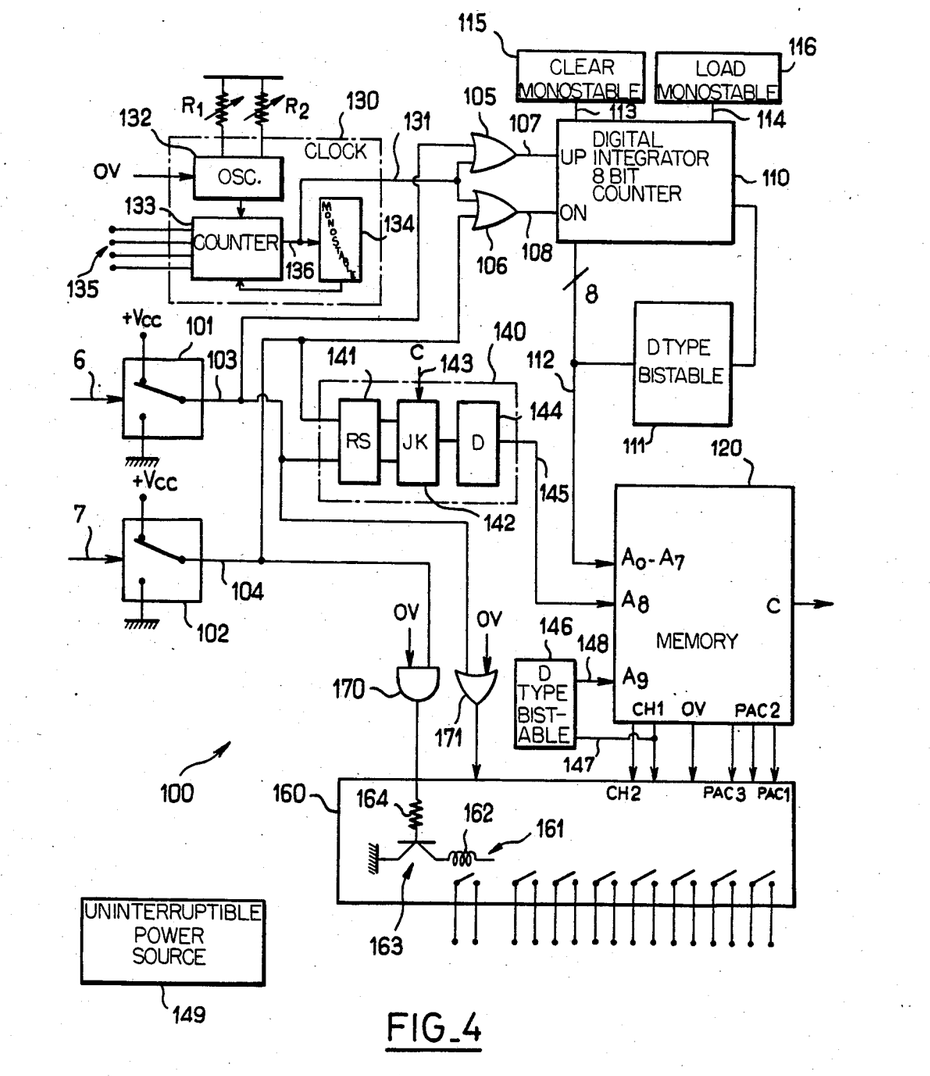
FIG. 4 is a diagram of the presently preferred embodiment of a control device in accordance with the invention.

As shown diagrammatically in FIG. 4, the outputs from the digital integrator or 8-bit counter 110 are connected to respective inputs of a system of D-type bistables 111 which permanently store the state of the integrator 110 and whose outputs are connected to the pre-select inputs of the integrator 110.

The system of D-type bistables 111 is powered by an un-interruptible DC power supply.

Thus, in the event of a power cut, all the circuits are turned off other than the D-type bistables which store the binary outputs from the digital integrator 110.

When the mains is restored, the load line of the counter 110 is enabled, thereby causing the digital integrator to restart from the most recent value stored in the system of D-type bistables 111 immediately prior to the power cut.

Thus, the binary output from the integrator 110 is insensitive to power cuts.

As shown diagrammatically by bus 112, the outputs from the digital integrator 110 are connected to the eight first address lines of a memory 120, e.g., an 8K-bit EPROM (erasable programmable read only memory) of the 2732 type.

The load 114 and clear 113 inputs of the digital integrator 110 are driven by respective monostables 115 and 116.

The time constant of the load monostable 116 is naturally greater than the time constant of the reset to zero monostable 115.

The monostables 115 and 116 may be constituted, for example, by Schmidt trigger circuits based on operational amplifiers.

After a power cut, both monostables are activated, with the monostable 115 clearing (i.e. resetting to zero) the digital integrator 110, and with the monostable 116 then causing the integrator 110 to be loaded with the last value stored in the system of D type bistables 111 prior to the power cut.

For initialization purposes, when the equipment is switched on for the first time, or when it is to be cleared manually, a pushbutton is provided for triggering the reset to zero monostable 115 on its own (the pushbutton is not shown in FIG. 4 in order to simplify the illustration).

Figure 3:
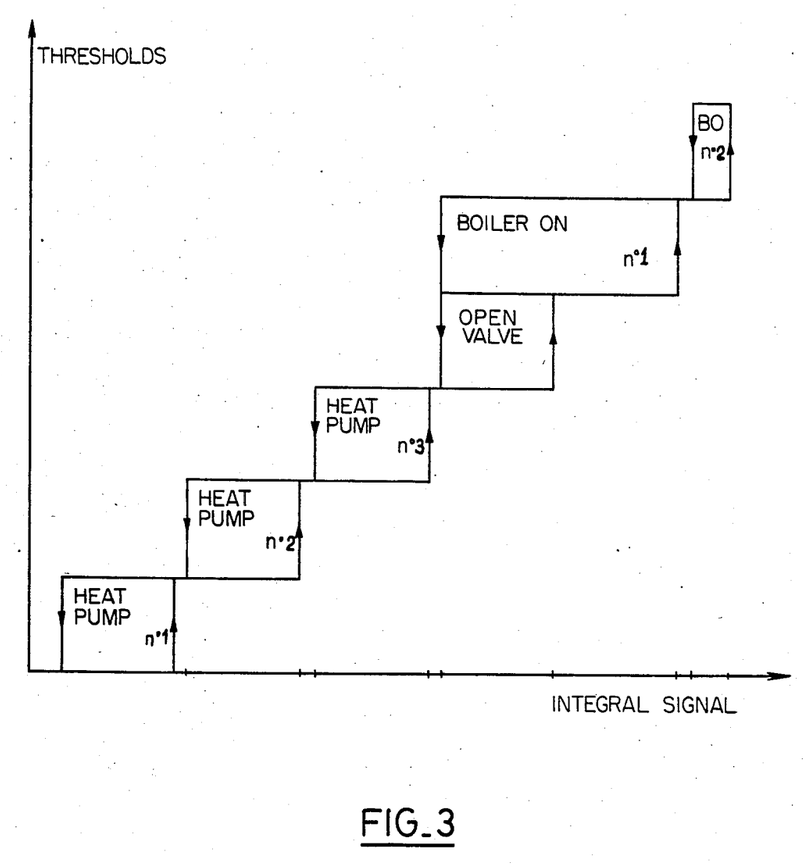
FIG. 3 is a graph showing how the thresholds are disposed in a control device in accordance with the present invention.

As shown in FIG. 3, in order to obtain stable regulation, the control curve applicable to the auxiliary generators space-space heat pumps PAC1, PAC2, PAC3 has a high degree of hysteresis.

In order to achieve this, it is necessary to modulate valid addresses in the memory 120 which constitutes the threshold relay depending on which one of the count-up and count-down inputs 107 and 108 of the integrator module 110 is enabled, i.e. when the control device is tending to switch on auxiliary heaters PAC1, PAC2, PAC3, or whether it is tending to switch them off.

The detection of which input is enabled is provided by means of an assembly given an overall reference 140 in FIG. 4.

More precisely, the assembly 140 comprises an RS type memory 141 having its R and S inputs connected to the outputs 103 and 104 of the interfaces 101 and 102, and which retains the last count-up or count-down pulse applied to the regulator 4 on its Q and $\overline{Q}$ outputs. This information is applied to a JK bistable 142 when the control device is not in a hysteresis cycle, and this condition is controlled by input 143 to the JK bistable 142 which is connected to an output referenced C from the threshold relay memory 120.

Finally, the information available at the output from the JK bistable 142 is stored in a D-type bistable which is one of the bistables powered by the uninterruptible DC supply in order to ensure that information is not lost during a power cut.

The output 145 from the D-type bistable 144 is connected to the eighth address line of memory 120.

Finally, the inventors have determined that it is desirable for safety reasons to apply hysteresis when controlling the first boiler CH1 so that in the switch-on direction the valve opens prior to the boiler being turned on in order to reheat the body of the boiler CH1, whereas in the switch-off direction the valve 1 should be closed prior to switching off the boiler CH1.

Here again this is done by controlling the state of address lines to the memory 120 as a function of the status of the first boiler CH1 (i.e. whether it is on or off).

This is provided by means of a D-type bistable 146 which is powered by an uninterruptible DC power supply as are the bistables 111 and 144. The input 147 to the D-type bistable 146 is connected to the output CH1 of the memory 120, and the output 148 from the D-type bistable 146 is connected to the ninth address line A9 of the memory 120.

The uninterruptible DC power supply applied to the D-type bistables 111, 144, and 146 is represented in FIG. 4 by a box 149.

FIG. 4 also shows an output interface circuit 160 comprising a set of relays 161 suitable for switching on and off the auxiliary generators PAC1, PAC2, PAC3, the conventional boilers CH1, CH2, and the bypass and mixer valves V and 1.

As shown diagrammatically in FIG. 4, each coil 162 of a relay 161 is controlled by a transistor 163 having its control inputs connected to receive a control signal via a resistance 164.

Two of the relays 161 connected to inputs of the motor 8 controlling the mixer valve 1 are controlled by respective outputs from two gates 170 and 171 both of which have a first input connected to the output 0V from the memory 120 and each of which has a second input connected to a respective one of the outputs 103 and 104 from the interfaces 101 and 102 in order to apply the output signals from the conventional regulator 4 to the mixer valve V.

The other relays 161 are controlled by the outputs CH1, CH2, OV, PAC1, PAC2, and PAC3 from the memory 120.

Operation of a control device in accordance with the present invention is described with reference to two tables which show the programming applied to the digital memory 120.

Programming table No. 1 shows the low address zone, i.e. the zone corresponding to logic level zero on the memory's address line A9.

Programming table No. 2 corresponds to the high address zone, i.e. to a logic level 1 signal on address line A9.

Each of these tables is divided into two sub-tables which correspond respectively to counting up and to counting down as detected by the means 140.

By dividing each of the programming tables into two sub-tables for counting up and for counting down respectively, it is possible to define a hyesteresis cycle for controlling each of the devices in the installation (heat pumps, boilers, and valves).

Furthermore, by dividing the programming of the memory 120 into two programming tables, one concerned with low addresses and the other with high addresses, it is possible to define a hysteresis cycle for controlling boiler No. 1 in such a manner that when it is switched on the mixer valve 1 opens before the boiler is switched on, thereby warming the body of the boiler, whereas when the boiler is being switched off, the valve is closed before the boiler is itself switched off.

The purpose of opening the valve before switching the boiler on is to limit corrosion in the boiler.

By allowing the water returning from the radiators to run through the boiler for some time prior to switching the boiler on, the cold parts of the boiler on which smoke condensation could have been high are warmed up, thereby reducing the amount of condensation which takes place. This is important since condensed smoke is acid (it contains sulphuric acid) since it includes water vapor and sulphur trioxide due to the presence of sulphur in the boiler fuel.

Outputs PAC1, PAC2, and PAC3 from the digital memory 120 provide on/off control for respective ones of the heat pumps, in accordance with the hysteresis cycles shown in FIG. 3.

The output OV from the digital memory 120 directly controls switching of the bypass valve V, likewise via a hysteresis cycle.

Outputs CH1 and CH2 from the digital memory 120 provide on/off control of boilers CH1 and CH2 respectively.

Output C from the digital memory 120 supplies information representative of the hysteresis cycle and is applied to the up/down count detection means 140, as described above.

Finally, gates 170 and 171 which are controlled firstly by the output OV from the digital memory 120 and secondly by the output signals from the input interfaces 101 and 102 modulate the mixer valve 1.

The mixer valve V begins to be open when the output OV from the digital memory 120 is enabled and simultaneously with the bypass valve V being switched over. The system is preferably adapted so that the mixer valve 1 is 45% open when the first boiler CH1 comes into operation.

Naturally, the present invention is not limited in any way to the specific embodiment described above, but extends to any equivalent system falling within the scope of the claims.

PROGRAMMING TABLE NO. 1

LOW ADDRESS ZONE: A9 = 0

| Address ranges $A_0 \to A_7A_8$ | C | ch2 | ch1 | OV | PAC 3 | PAC 2 | PAC 1 | Hex. Output |
|---|---|---|---|---|---|---|---|---|
| Count up | | | | | | | | |
| 00 | 1 | 0 | 0 | 0 | 0 | 0 | 0 | C0 |
| 01 → 09 | 1 | 0 | 0 | 0 | 0 | 0 | 0 | 40 |
| 0A → 2D | 0 | 0 | 0 | 0 | 0 | 0 | 0 | 00 |
| 2E → 31 | 1 | 0 | 0 | 0 | 0 | 0 | 1 | 41 |
| 32 → 55 | 0 | 0 | 0 | 0 | 0 | 0 | 1 | 01 |
| 56 → 59 | 1 | 0 | 0 | 0 | 0 | 1 | 1 | 43 |
| 5A → 7D | 0 | 0 | 0 | 0 | 0 | 1 | 1 | 03 |
| 7E → 81 | 1 | 0 | 0 | 0 | 1 | 1 | 1 | 47 |
| 82 → A5 | 0 | 0 | 0 | 0 | 1 | 1 | 1 | 07 |
| A6 → A9 | 1 | 0 | 0 | 1 | 1 | 1 | 1 | 4F |
| AA → CD | 0 | 0 | 0 | 1 | 1 | 1 | 1 | 0F |
| CE → D1 | 1 | 0 | 1 | 1 | 1 | 1 | 1 | 5F |
| D2 → DD | 0 | 0 | 1 | 1 | 1 | 1 | 1 | 1F |
| DE → E5 | 1 | 1 | 1 | 1 | 1 | 1 | 1 | 7F |
| E6 → FE | 1 | 1 | 1 | 1 | 1 | 1 | 1 | FF |
| FF | 0 | 1 | 1 | 1 | 1 | 1 | 1 | BF |
| Count down | | | | | | | | |
| 100 | 1 | 0 | 0 | 0 | 0 | 0 | 0 | C0 |
| 101 → 109 | 1 | 0 | 0 | 0 | 0 | 0 | 0 | 40 |
| 10A → 12D | 0 | 0 | 0 | 0 | 0 | 0 | 0 | 01 |
| 12E → 131 | 1 | 0 | 0 | 0 | 0 | 0 | 1 | 41 |
| 132 → 155 | 0 | 0 | 0 | 0 | 0 | 1 | 1 | 03 |
| 156 → 159 | 1 | 0 | 0 | 0 | 0 | 1 | 1 | 43 |
| 15A → 17D | 0 | 0 | 0 | 0 | 1 | 1 | 1 | 07 |
| 17E → 181 | 1 | 0 | 0 | 0 | 1 | 1 | 1 | 47 |
| 182 → 1A5 | 0 | 0 | 0 | 1 | 1 | 1 | 1 | 0F |
| 1A6 → 1A9 | 1 | 0 | 0 | 1 | 1 | 1 | 1 | 4F |
| 1AA → 1CD | 0 | 0 | 1 | 1 | 1 | 1 | 1 | 1F |
| 1CE → 1D1 | 1 | 0 | 1 | 1 | 1 | 1 | 1 | 5F |
| 1D2 → 1DD | 0 | 1 | 1 | 1 | 1 | 1 | 1 | 3F |
| 1DE → 1E5 | 1 | 1 | 1 | 1 | 1 | 1 | 1 | 7F |
| 1E6 → 1FE | 1 | 1 | 1 | 1 | 1 | 1 | 1 | FF |
| 1FF | 0 | 1 | 1 | 1 | 1 | 1 | 1 | BF |

PROGRAMMING TABLE NO. 2

HIGH ADDRESS ZONE: A9 = 1

| Address ranges $A_0 \to A_7A_8$ | C | ch2 | ch1 | OV | PAC 3 | PAC 2 | PAC 1 | Hex. Output |
|---|---|---|---|---|---|---|---|---|
| Count up | | | | | | | | |
| 200 | 1 | 0 | 0 | 0 | 0 | 0 | 0 | C0 |
| 201 → 201 | 1 | 0 | 0 | 0 | 0 | 0 | 0 | 40 |
| 20A → 22D | 0 | 0 | 0 | 0 | 0 | 0 | 0 | 00 |
| 22E → 231 | 1 | 0 | 0 | 0 | 0 | 0 | 1 | 41 |
| 232 → 255 | 0 | 0 | 0 | 0 | 0 | 0 | 1 | 01 |
| 256 → 259 | 1 | 0 | 0 | 0 | 0 | 1 | 1 | 43 |
| 25A → 27D | 0 | 0 | 0 | 0 | 0 | 1 | 1 | 03 |
| 27E → 281 | 1 | 0 | 0 | 0 | 1 | 1 | 1 | 47 |
| 282 → 2A5 | 0 | 0 | 1 | 0 | 1 | 1 | 1 | 1F |
| 2A6 → 2A9 | 1 | 0 | 1 | 1 | 1 | 1 | 1 | 5F |
| 2AA → 2CD | 0 | 0 | 1 | 1 | 1 | 1 | 1 | 1F |
| 2CE → 2D1 | 1 | 0 | 1 | 1 | 1 | 1 | 1 | 5F |
| 2D2 → 2DD | 0 | 0 | 1 | 1 | 1 | 1 | 1 | 1F |
| 2DE → 2E5 | 1 | 1 | 1 | 1 | 1 | 1 | 1 | 7F |
| 2E6 → 2FE | 1 | 1 | 1 | 1 | 1 | 1 | 1 | FF |
| 2FF | 0 | 1 | 1 | 1 | 1 | 1 | 1 | BF |
| Count down | | | | | | | | |
| 300 | 1 | 0 | 0 | 0 | 0 | 0 | 0 | C0 |
| 301 → 309 | 1 | 0 | 0 | 0 | 0 | 0 | 0 | 40 |
| 30A → 32D | 0 | 0 | 0 | 0 | 0 | 0 | 0 | 01 |
| 32E → 331 | 1 | 0 | 0 | 0 | 0 | 0 | 1 | 41 |
| 332 → 355 | 0 | 0 | 0 | 0 | 0 | 1 | 1 | 03 |
| 356 → 359 | 1 | 0 | 0 | 0 | 0 | 1 | 1 | 43 |
| 35A → 37D | 0 | 0 | 0 | 0 | 1 | 1 | 1 | 07 |
| 37E → 381 | 1 | 0 | 0 | 0 | 1 | 1 | 1 | 47 |
| 382 → 3A5 | 0 | 0 | 1 | 1 | 1 | 1 | 1 | 1F |
| 3A6 → 3A9 | 1 | 0 | 1 | 1 | 1 | 1 | 1 | 5F |
| 3AA → 3CD | 0 | 0 | 1 | 1 | 1 | 1 | 1 | 1F |
| 3CE → 301 | 1 | 0 | 1 | 1 | 1 | 1 | 1 | 5F |
| 3D2 → 3DD | 0 | 1 | 1 | 1 | 1 | 1 | 1 | 3F |
| 3DE → 3E5 | 1 | 1 | 1 | 1 | 1 | 1 | 1 | 7F |
| 3E6 → 3FE | 1 | 1 | 1 | 1 | 1 | 1 | 1 | FF |
| 1FF | 0 | 1 | 1 | 1 | 1 | 1 | 1 | BF |

We claim:

1. A method of transforming a pre-existing heating installation having a main heat generator, at least one radiator, a three path modulating mixer valve wherein a first path of said valve is connected to the output of the main generator, a second path of the valve is connected to the input of the radiator, the output of the radiator is connected to input of main heat generator and is also connected to the third path of the valve, a motor for controlling opening and closing of the valve, a first probe measuring the outside temperature $T_{ext}$, a second probe disposed between the second path of the valve and the input of the radiator to measure the departure temperature $T_d$ of the fluid supplied to the radiator, a comparator-regulator which compares the outside temperature $T_{ext}$ and the departure temperature $T_d$ and which generates on two outputs of the comparator-regulator two on/off signals for actuating said motor, said method comprising the steps of (1) adding a plurality of auxiliary heat generators in the form of heat pumps which are connected in parallel between the output of the radiator on the one hand and the input of the main heat generator and the third path of the valve on the other hand, (2) adding between said comparator-regulator and said motor controlling the mixer valve a control device which comprises:

an integrator module having its inputs connected to the outputs of the comparator-regulator, a plurality of threshold relays having respectively different thresholds, said threshold relays being controlled by the output of said integrator module, so as to bring into service in succession the auxiliary heat generators, and to bring into service the main heat generator when the signal output by the integrator module exceeds a predetermined threshold, and a switch controlled by said threshold relays, said switch being closed when the signal output by the integrator module exceeds said predetermined threshold to apply the on/off signals generated by the comparator-regulator to said motor.

2. A heating installation comprising:
a main heat generator, at least one radiator, a plurality of auxiliary heat generators in the form of heat pumps which are connected in parallel, a three-path modulating mixer valve, wherein a first path of said valve is connected to the output of the main heat generator, a second path of the valve is connected to the input of the radiator, the output of the radiator is connected to the input of the auxiliary heat generators, the output of the auxiliary heat generators is connected to the third path of the valve and also to the input of the main heat generator, a motor for controlling opening and closing of the valve, a first probe measuring the outside temperature $T_{ext}$, a second probe disposed between the second path of the valve and the input of the radiator to measure the departure $T_d$ of the fluid supplied to the radiator, a comparator-regulator whcih compares the outside temperature $T_{ext}$ and the departure temperature $T_d$ and which generates on two outputs of the comparator-regulator two on/off signals for actuating said motor, an integrator module having its input connected to the outputs of the comparator-regulator, a plurality of threshold relays having respectively different thresholds, said threshold relays being controlled by the output of said integrator module, so as to bring into service in succession the auxiliary heat generators, and to bring into service the main heat generator when the signal output by the integrator module exceeds a predetermined threshold, and a switch controlled by said threshold relays, said switch being closed when the signal output by the integrator module exceeds said predetermined threshold to apply the on/off signals generated by the comparator-regulator to said motor.

3. A heating installation comprising:

a main heat generator, at least one radiator, a plurality of auxiliary heat generators in form of heat pumps which are connected in parallel, a three-path modulating mixer valve, wherein a first path of said valve is connected to the output of the main heat generator, a second path of the valve is connected to the input of the radiator, the output of the radiator is connected to the input of the auxiliary heat generators, the output of the auxiliary heat generators is connected to the third of the valve and also to the input of the main heat generator, a motor for controlling opening and closing of the valve, a first probe measuring the outside temperature $T_{ext}$, a second probe disposed between the second path of the valve and the input of the radiator to measure the departure temperature $T_d$ of the fluid supplied to the radiator, a comparator-regulator which compares the outside temperature $T_{ext}$ and the departure temperature $T_d$ and which generates on two outputs of the comparator-regulator two on/off signals for actuating said motor, two relays which are respectively controlled by the output of said comparator-regulator to switch between two logic levels, a digital up/down counter having a count-up input and a count-down input, a clock which delivers an alternating signal of adjustable frequency, two logic gates each having two inputs and one output, with the first of the inputs of the two logic gates being connected to a respective output of said relays, while the second of the inputs of the two logic gates are connected to the output of the clock, the outputs of the two logic gates being respectively connected to the count-up input and to the count-down input of the digital counter, a digital memory having address lines connected to the outputs of the digital up/down counter and the memory outputs, a plurality of relays controlled by the outputs of said digital memory, so as to bring into service in succession the auxiliary heat generators, and the main heat generator, a switch controlled by said digital memory so that when said switch is closed the on/off signals generated by the comparator-regulator are applied to said motor controlling the mixer valve.

4. A heating installation according to claim 2, wherein the integrator module includes at least one digital up/down counter.

5. A heating installation according to claim 4, wherein the count-up and count-down inputs of the integrator module are enabled by respective relays under the control of the outputs from the comparator-regulator.

6. A heating installation according to claim 5, including two 2-input logic gates whose outputs are respectively connected to the count-up and the count-down inputs of the integrator module, with first inputs of the logic gates begin controlled by respective ones of said relays, while the second input of the logic gates are connected to the output from a clock which delivers an alternating signal of adjustable frequency.

7. A heating installation according to claim 4, wherein said threshold relays comprise a digital memory having address lines connected to outputs from the integrator module.

8. A heating installation according to claim 4, and including a memory member whose inputs are connected to the outputs from the digital up/down counter and whose outputs are connected to pre-selected inputs of said up/down counter in order to reload the integrator module after a power cutoff to return said integrator module to its state immediately preceding the power cutoff.

9. A heating installation according to claim 7, including a memory member having its input connected to the output of the digital memory which provides on/off control of a first boiler and whose output is connected to an address line of the digital memory in order to define a hysteresis cycle in the control of said first boiler such that when said boiler is switched on, said mixer valve is switched on prior to said boiler in order to warm the body of the boiler, whereas when said boiler is switched off, said mixer valve is closed prior to said boiler being switched off.

10. A heating installation according to claim 7, including means suitable for detecting when the count-up and the count-down inputs of the integrator module are enabled, and having an output connected to an address line of the digital memory to provide a hysteresis cycle in the control of the auxiliary generators.

11. A heating installation according to claim 10, wherein the output from said means for detecting when the count-up and the count-down inputs of the integrator module are enabled is connected to said address line associated with the digital memory via a memory member.

12. A heating installation according to claim 8, wherein said memory members are constituted by bistables which are powered by an uninterruptible DC power supply.

13. A heating installation according to claim 9, wherein said memory members are constituted by bistables which are powered by an uninterruptible DC power supply.

14. A heating installation according to claim 11, wherein said memory members are constituted by bistables which are powered by an uninterruptible DC power supply.

15. A heating installation according to claim 3 wherein a set of bistables which are powered by an uninterruptible DC power supply are connected to the outputs of the digital up/down counter, the outputs of said bistables being connected to the pre-selected inputs of said up/down counter in order to reload the digital counter after a power cutoff to return said digital counter to its state immediately preceding the power cutoff.

16. A heating installation according to claim 3 wherein a bistable which is powered by an uninterruptible DC power supply has its input connected to the output of the digital memory which provides on/off control of the main heat generator and whose output is connected to an address line of the digital memory in order to define a hysteresis cycle in the control of said main heat generator such that when said main heat generator is switched on, said mixer valve is switched on prior to said main heat generator in order to warm the body of the main heat generator, whereas when said main heat generator is switched off, said mixer valve is closed prior to said main heat generator being switched off.

17. A heating installation according to claim 3 including means connected to the outputs of said two relays to detect when the count-up and the count-down inputs of the digital counter are enabled, and having an output connected to the input of a bistable which is powered by an uninterruptible DC power supply, the output of said bistable being connected to an address line of the digital memory to provide a hysteresis cycle in the control of the auxiliary heat generators.

* * * * *